United States Patent

Bowden et al.

(10) Patent No.: US 6,832,493 B2
(45) Date of Patent: Dec. 21, 2004

(54) HIGH PURITY GLASS BODIES FORMED BY ZERO SHRINKAGE CASTING

(75) Inventors: Bradley F. Bowden, Alfred, NY (US); Kenneth E. Hrdina, Horseheads, NY (US); John F. Wight, Jr., Corning, NY (US); Chunzhe C. Yu, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 267 days.

(21) Appl. No.: 10/086,231

(22) Filed: Feb. 27, 2002

(65) Prior Publication Data

US 2003/0159464 A1 Aug. 28, 2003

(51) Int. Cl.[7] .................. C03B 19/02; B28B 1/26
(52) U.S. Cl. ............... 65/17.3; 65/17.6; 65/21.5; 264/86; 264/87
(58) Field of Search .................. 65/17.2, 17.3, 65/17.6, 21.5; 264/37.1, 651, 86, 87

(56) References Cited

U.S. PATENT DOCUMENTS

| | | | |
|---|---|---|---|
| 2,326,058 A | | 8/1943 | Nordberg ............... 100/52 |
| 4,126,422 A | * | 11/1978 | Brandes ............... 23/293 R |
| 4,501,602 A | | 2/1985 | Miller et al. ............... 65/18.2 |
| 4,541,855 A | * | 9/1985 | Scherer ............... 65/395 |
| 4,830,802 A | * | 5/1989 | Ito et al. ............... 264/135 |
| 4,888,036 A | * | 12/1989 | Clasen ............... 65/17.2 |
| 4,908,174 A | * | 3/1990 | Will ............... 264/87 |
| 5,043,002 A | | 8/1991 | Dobbins et al. ............... 65/3.12 |
| 5,149,474 A | * | 9/1992 | Rohatyn ............... 264/220 |
| 5,152,819 A | | 10/1992 | Blackwell et al. ............... 65/3.12 |
| 5,154,744 A | | 10/1992 | Blackwell et al. ............... 65/3.12 |
| 5,240,488 A | * | 8/1993 | Chandross et al. ............... 65/395 |
| 5,521,129 A | * | 5/1996 | Campos-Loriz et al. ......... 501/89 |
| 5,686,728 A | | 11/1997 | Shafer ............... 250/492.2 |
| 5,866,062 A | * | 2/1999 | Moritz et al. ............... 264/637 |
| 5,944,866 A | * | 8/1999 | Chen et al. ............... 65/395 |
| 5,970,751 A | | 10/1999 | Maxon et al. ............... 65/414 |
| 6,013,399 A | | 1/2000 | Nguyen ............... 430/5 |
| 6,193,926 B1 | * | 2/2001 | MacKinnon ............... 264/621 |
| 6,299,318 B1 | | 10/2001 | Braat ............... 359/856 |

FOREIGN PATENT DOCUMENTS

| | | | |
|---|---|---|---|
| EP | 0 903 605 A2 | 3/1999 | ......... G02B/13/14 |
| EP | 1 106 582 A2 | 6/2001 | ......... C03B/19/10 |
| WO | WO 00/48775 | 8/2000 | |
| WO | WO 01/07967 | 2/2001 | ......... G03C/5/00 |
| WO | WO 01/08163 | 2/2001 | ......... G21K/5/00 |
| WO | WO 01/75522 | 10/2001 | ......... G03F/1/14 |
| WO | WO 02/26647 | 4/2002 | ......... C03B/37/016 |
| WO | WO 02/32616 | 4/2002 | ......... B23P/13/04 |
| WO | WO 02/32622 | 4/2002 | ......... B24B/7/24 |

OTHER PUBLICATIONS

P. Shultz & H. Smith, Ultra–Low–Expansion Glasses and Their Structure in the $SiO_2$–$TiO_2$ System, Amorphous Materials, papers presented to the Third International Conference on the Physics of Non–Crystalline Solids, held at Sheffield University, Sep. 1970

(List continued on next page.)

Primary Examiner—Steven P. Griffin
Assistant Examiner—Carlos Lopez
(74) Attorney, Agent, or Firm—Timothy M. Schaeberle; Kevin M. Able

(57) ABSTRACT

The present invention relates to a method for forming an optical device. The method includes providing a glass aggregate. Typically, the glass aggregate is a mixture of fine glass soot particles and coarser ground or milled glass powder. The glass particles are mixed with a liquid to form a slurry which is cast in a mold to form a porous pre-form. Subsequently, the porous pre-form is consolidated into a glass object by heating the pre-form at a relatively high temperature. The method of the present invention produces optical components having substantially no striae. As a result, scattering is substantially reduced when EUV light is reflected from a component produced from the optical blank.

38 Claims, 5 Drawing Sheets

OTHER PUBLICATIONS

George H. Beall, Industrial Applications iof Silica, Reviews in Mineralogy, vol. 29 (Silica), (1994), 469–505.

Charles Gwyn et al., Extreme Ultraviolet Lithography, Nov. 1999, 97–141.

EUV Lithography NGL Technology Review, Jun. 9, 1999, Chicago, Illinois.

Charles Gwyn et al., Extreme Ultraviolet Lithography, 1–6, no date available.

William M. Tong et al., Substrates Requirements For Extreme Ultraviolet Lithography, Information Science & Technology, Lawrence Livermore National Laboratory, Dec. 1999.

O.V. Mazurin et al., Crystallizaiton of Silica and Titanium Oxide–Silica Corning Glasses (Codes 7940 & 7971), Journal of Non–Crystalline Solids 18, (1975) 1–9.

Isimoto Co. Ltd., Purity and Chemical Reactivity, http://www.isimoto.com/isimoto/english/feature1.html, 1–3, May 17, 1999.

Isimoto Co. Ltd., Product Information, http://www.isimoto.com/isimoto/english/product info.html, 1–4, May 17, 1999.

Rapid Prototyping, http://mtiac.iitri.org/pubs/rp/rp1.htm, Nov. 5, 2001.

Products: SLS (R) Systems—Introduction, Vanguard™ and Vanguard™ HS, http://www.3dsystems.com/products/sls-systems/vanguard/index.asp?promo=, Nov. 5, 2001.

Corning, Semiconductor Materials ULE Zero Expansion Glass, http://www.corning.com/semiconductormaterials/products_services/ule.asp, Oct. 31, 2001.

Richard H. Stulen et al., Extreme Ultraviolet Lithography, IEEE Journal of Quantum Electronics, vol. 35, No. 5, May 1999, 694–699..

* cited by examiner

HIGH PURITY GLASS BODIES FORMED BY ZERO SHRINKAGE CASTING

BACKGROUND OF THE INVENTION

1. Field of the Invention

The present invention relates generally to a method for making glass, and particularly to a method for making high purity glass bodies.

2. Technical Background

Integrated circuits (ICs) are fabricated using microlithographic systems. The goal of IC manufacturers is to produce integrated circuits having linewidths as small as possible. Most of the microlithographic systems currently in use employ transmission optics having an illumination source coupled to an illumination optics assembly. These system components provide a photomask with illumination light. The illumination optics expand and collimate the laser light to thereby homogenize the light intensity. The photomask includes the image of an integrated circuit disposed thereon. The photomask is positioned between the illumination optics and a projection optical system. The projection optical system projects the image of the integrated circuit onto the semiconductor substrate to thereby expose the substrate. Both the illumination optical system, the photomask, and the projection optical system employ transmission optics. One way of reducing the linewidth in systems that employ transmission optics is to reduce the wavelength of the laser light source.

It was once thought the limit of making integrated circuits using transmission optics would be somewhere around one micron. However, with illumination light sources being capable of transmitting much shorter wave lengths, one-tenth micron feature sizes and smaller are currently being produced. For example, KrF lasers, which operate at a wavelength of 248 nm, are capable of producing integrated circuits having linewidths approaching 100 nm. ArF lasers represent an improvement over KrF lasers, operating at a wavelength of 193 nm. With improvements to the transmission optics, integrated circuits can theoretically be produced with linewidths near 70 nm. Designers are now considering $F_2$ lasers. These lasers operate at a wavelength of 157 nm. $F_2$ lasers hold the promise of producing integrated circuits having linewidths on the order of 50 nm.

While it may be possible to further reduce the operating wavelength of light sources used in illumination systems, the very use of transmission optics is becoming a limiting factor. The problem is that the glass materials currently employed are not transparent at shorter wavelengths. Integrated circuit manufacturers have seen this problem coming for some time and are investigating ways of overcoming the above described limitations.

In one very promising approach, designers are considering reflective optical microlithographic systems that employ extreme ultraviolet (EUV) illumination sources. EUV systems operate at wavelengths in an approximate range between 11 nm and 13 nm. Instead of transmitting light through lens systems, reflective optical systems employ mirrors to direct the light onto the semiconductor substrate. The photomasks used in EUV systems are also reflective. Because the wavelengths in EUV systems are so short, any irregularity present on the surface of a mirror will significantly degrade system performance. Thus, the optical blanks used to produce EUV mirrors must be of the highest quality.

Quality optical blanks useful in current microlithographic systems are being produced using a flame hydrolysis process. A mixture of very pure silica precursor and a titania precursor are delivered in vapor form to a flame. The precursors react to form $SiO_2$—$TiO_2$ soot particles. The soot particles melt in layers forming a solid fused silica optical blank. While this method can be used to produce high quality optical components for optically transmissive devices, this method has drawbacks when it is used to make EUV reflective optical components.

One problem being encountered in the fabrication of mirrors suitable for EUV applications is the presence of striae in the optical blank. FIG. 1 is a photograph showing an optical blank 1 made in accordance with the flame hydrolysis process described above. As shown, optical blank 1 includes striae 2 disposed therein. The striae 2 are formed as layers of soot are deposited during the flame hydrolysis process. Striae 2 are less of an issue in photomasks than in optical mirror components. Another problem associated with striae 2 is known as springback. Springback refers to the shape change of a glass object with a non-uniform coefficient of thermal expansion (CTE). The change in shape typically occurs upon removal of material from the glass object. Another problem relates to the presence and distribution of inclusions within the glass. Inclusions are either solid impurities or gaseous bubbles disposed within the glass. The occurrence of inclusions in glass made using the flame hydrolysis process is low, but improvements are always desired especially for EUV applications.

A method is needed to produce optical blanks having substantially no striae and no low frequency thermal expansion variations. A method is needed to produce low expansion glass suitable for various applications including transmission optics over a wide range of wavelengths. What is also needed is a method for producing EUV compatible optical blanks for use in reflective microlithography. A method is also needed that enables the production of large optical devices without cracking.

SUMMARY OF THE INVENTION

The present invention relates to a method for producing optical blanks for EUV microlithographic components. The present invention provides a method for producing homogeneous optical blanks having substantially no striae. The method of the present invention produces dense, substantially inclusion free glass. As a result, scattering is substantially reduced when EUV light is reflected from a component produced from the optical blank. Furthermore, the method of the present invention is also advantageous because it enables the production of large optical blanks that are not susceptible to cracking.

One aspect of the present invention is a method for forming a glass body. The method includes providing a glass aggregate. The glass aggregate is mixed with a liquid to form a slurry. The slurry is cast in a mold to form a porous pre-form. The mold includes a porous glass substrate. The porous pre-form is consolidated into a glass object.

In another embodiment, the present invention is a method for forming a glass body. The method includes providing a glass aggregate. The glass aggregate is mixed with a liquid to form a slurry. The slurry is pressure cast in a mold to form a porous pre-form. The porous pre-form is heated to form a glass object.

In another embodiment, the present invention is a method for forming a glass body. The method includes providing glass particles. The glass particles include relatively fine glass soot particles mixed with relatively coarse glass particles. The glass particles are mixed with a liquid to form a slurry. The slurry is pressure cast in a mold to form a porous pre-form. The porous pre-form is heated to form a glass object.

In another embodiment, the present invention is a method for forming a glass body. The method includes providing glass particles, the particles including relatively fine glass soot particles mixed with relatively coarse glass particles. The glass particles are mixed with a liquid to form a slurry. A mold is provided that has a glass substrate. The slurry is pressure cast in the mold to form a porous pre-form. The porous pre-form is consolidated to form a glass object.

In another embodiment, the present invention is a method for forming a glass body. The method includes providing a glass aggregate. The glass aggregate is mixed with a liquid to form a slurry. The slurry is pressure cast in a mold to form a porous pre-form. The porous pre-form is disposed in a chlorine gas atmosphere heated to a predetermined temperature. The chlorine gas reacts with the impurities for a pre-determined time, whereby the impurities are vaporized and carried out of the porous pre-form. The porous pre-form is consolidated to form a glass object.

In another embodiment, the present invention is a method for forming a glass body. The method includes providing glass particles, the particles including relatively fine glass soot particles mixed with relatively coarse glass particles. The glass particles are mixed with a liquid to form a slurry. The slurry is pressure cast in a mold to form a porous pre-form. The porous pre-form is disposed in a chlorine gas atmosphere heated to a predetermined temperature, the chlorine gas reacting with the impurities for a pre-determined time, whereby the impurities are vaporized and carried out of the porous pre-form. The porous pre-form is consolidated to form a glass object.

In another embodiment, the present invention is a method for forming a glass body. The method includes the step of providing a glass aggregate. The glass aggregate is mixed with a liquid to form a slurry. The slurry is cast in a mold to form a porous pre-form, the mold including a porous glass substrate having the same composition as the glass aggregate. The porous pre-form is consolidated into the glass body.

In another embodiment, the present invention is a method for forming a glass body. The method includes the step of forming soot particles as a by-product of a flame hydrolysis process. The soot particles are mixed with a liquid to form a slurry. Coarse glass cutlet is disposed in a mold. The slurry is vacuum cast in a mold to form a porous pre-form. The mold includes a porous glass substrate. The porous pre-form is consolidated into the glass body.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION

Reference will now be made in detail to the present exemplary embodiments of the invention, examples of which are illustrated in the accompanying drawings. Wherever possible, the same reference numbers will be used throughout the drawings to refer to the same or like parts.

In accordance with the invention, the present invention relates to a method for forming an optical device. The method includes providing glass particles. The glass particles are mixed with a liquid to form a slurry. The slurry is cast in a mold to form a porous pre-form. The porous pre-form is consolidated into a glass object. The method of the present invention produces optical components having substantially no striae and substantially no low frequency compositional variations. As a result, scattering is substantially reduced when EUV light is reflected from a component produced from the optical blank. In one embodiment of the present invention, the glass particles are a mixture of two vastly different particle sizes. The mixture of particle sizes allows efficient particle packing within the slurry and the filter cake. Thus, large glass bodies can be formed without cracking because porosity and shrinkage are minimized during casting and firing. Using larger pieces of glass within the glass mixture allows parts to cast at faster rates because the pore channels are correspondingly higher and the capillary stresses within the parts decrease as the particle size increases.

Figure 1:
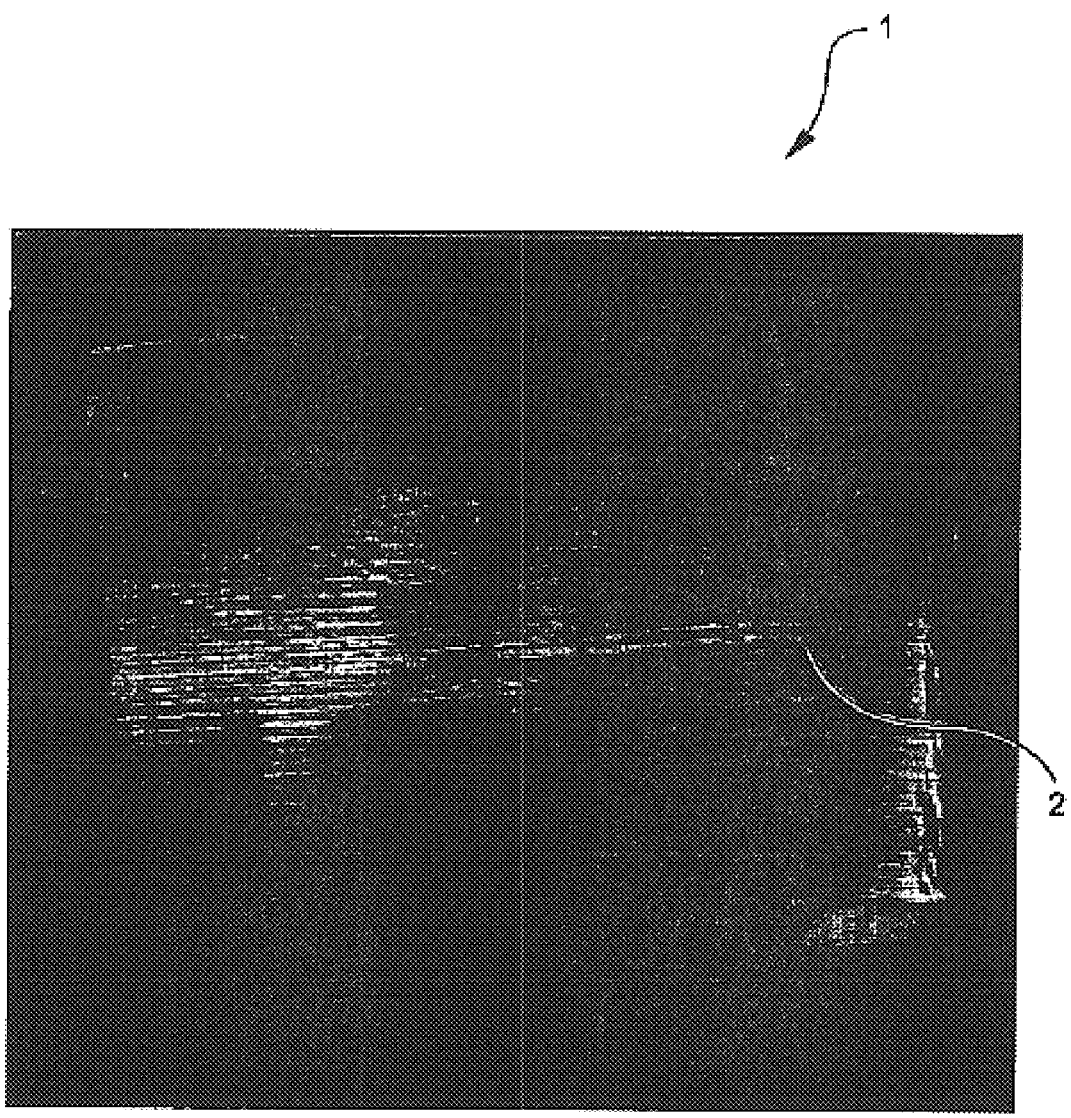
FIG. 1 is a photograph showing an optical blank made in accordance with the flame hydrolysis process.
Figure 2:
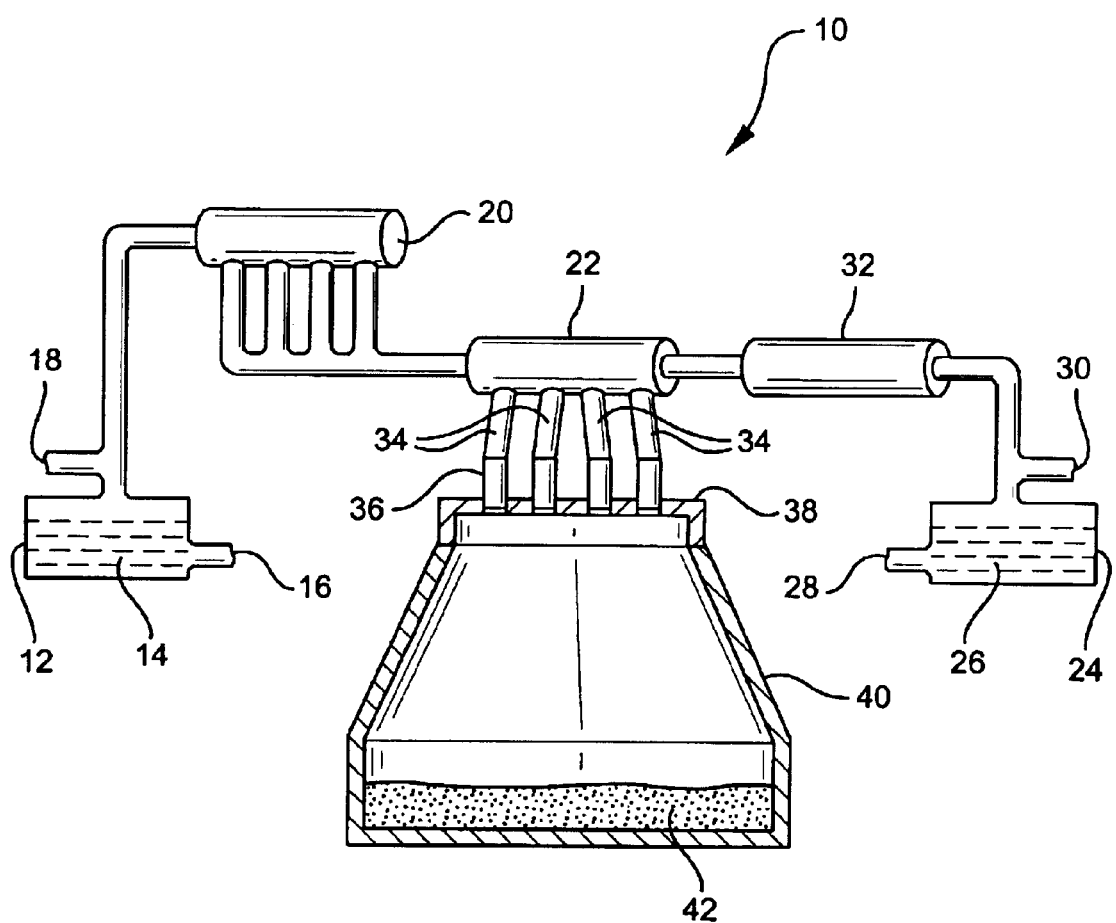
FIG. 2 is a schematic of a system for producing soot particles in accordance with one embodiment of the present invention.

As embodied herein, and depicted in FIG. 2, a schematic of system 10 for the direct production of soot particles using flame hydrolysis in accordance with one embodiment of the present invention is disclosed. System 10 includes a source of silica precursor 14. A carrier gas 16, such as nitrogen, is introduced at or near the base of source 12. A bypass stream of carrier gas is introduced at 18 to prevent saturation of the vaporous stream. The vaporous stream passes through distribution system 20 to manifold 22. System 10 also includes source 24 of the titania precursor 26. Those of ordinary skill in the art will recognize that the titania precursor is used in the fabrication of ULE glass. ULE glass is fused silica glass that includes 6–9 wt % titania. When HPFS is being produced, no titania precursor is employed. Source 24 also has inlet 28 for a carrier gas that is transmitted through precursor material 26. A by-pass stream is introduced at 30. The vaporous stream passes through distribution system 32 to manifold 22.

The silica vapor stream and the titania vapor stream mix in manifold 22. The mixture passes through fume lines 34 to burners 36 mounted in upper portion of furnace 38. The mixed vapor stream is further joined with a fuel/oxygen mixture at burners 36. The vapor stream combusts and is oxidized to form silica-titania particles at a temperature in excess of 1600° C. The particles cool and are directed into collection chamber 40. There the particles form a layer of pure ULE or HPFS soot 42. Great care is taken to maintain chamber 40 such that the soot is free from impurities and contaminants.

In another embodiment, soot particles 42 are formed as a by-product of a flame hydrolysis process used to make the ultra-low expansion (ULE) glass and High Purity Fused Silica (HPFS) glass manufactured by Corning Incorporated. In this embodiment, after the vapor stream combusts and is oxidized, forming silica-titania particles, the particles are directed into a cup in the refractory furnace where they melt to form a porous pre-form. However, a significant portion of the glass particles 42 are deposited in the cup, but rather are drawn out of the furnace where they cool and are collected in a bag house. One problem associated with this method is the presence of many impurities and foreign materials in the bag house. Many of these contaminants find their way into the bag house. The bag house soot has a slightly different composition than that of the preform.

In one embodiment of the present invention, soot 42 is mixed with a coarser glass powder to obtain a glass aggregate. The coarse glass powder is obtained by milling or grinding glass having the same composition as soot 42. The use of a mixture of two or three vastly different particle sizes has several distinct advantages. Large glass bodies can be formed without cracking because shrinkage is minimized during casting. In another embodiment, the glass aggregate is formed by mixing glass soot, glass cullet, and larger pieces of glass. The mixture of particle sizes allows good particle packing within the slurry. Using larger pieces of glass within the glass mixture allows parts to cast at faster rates because the capillary stresses within the parts decrease as the particle size increases.

In the next step, the glass mixture is mixed with water in a 70-30 weight percent suspension to create a slurry. In one embodiment, an ammonia hydroxide dispersant is added to the slurry.

Figure 3A:
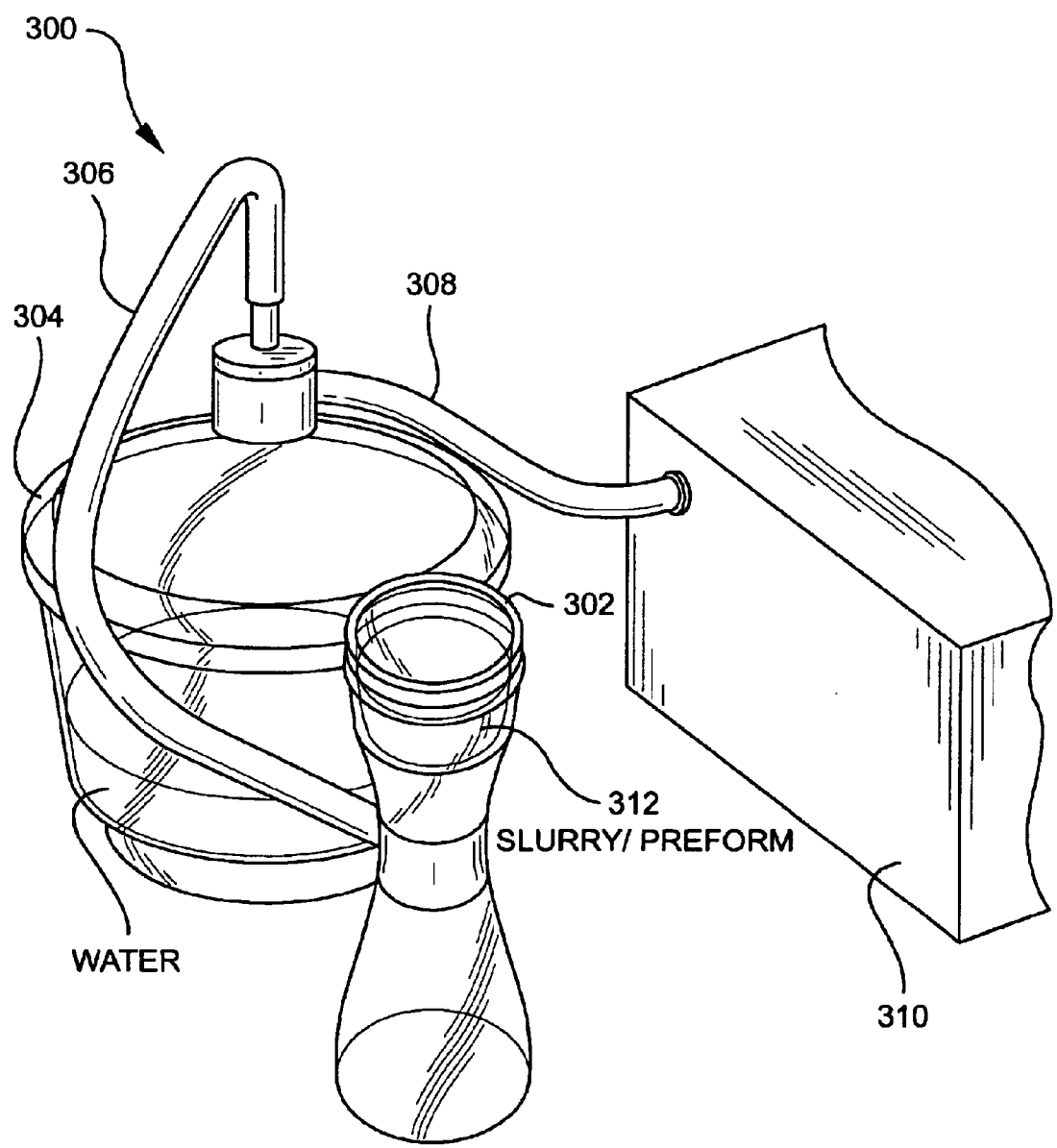
FIG. 3A is a perspective view of an apparatus for pressure casting a porous pre-form in accordance with one embodiment of the present invention.
Figure 3B:
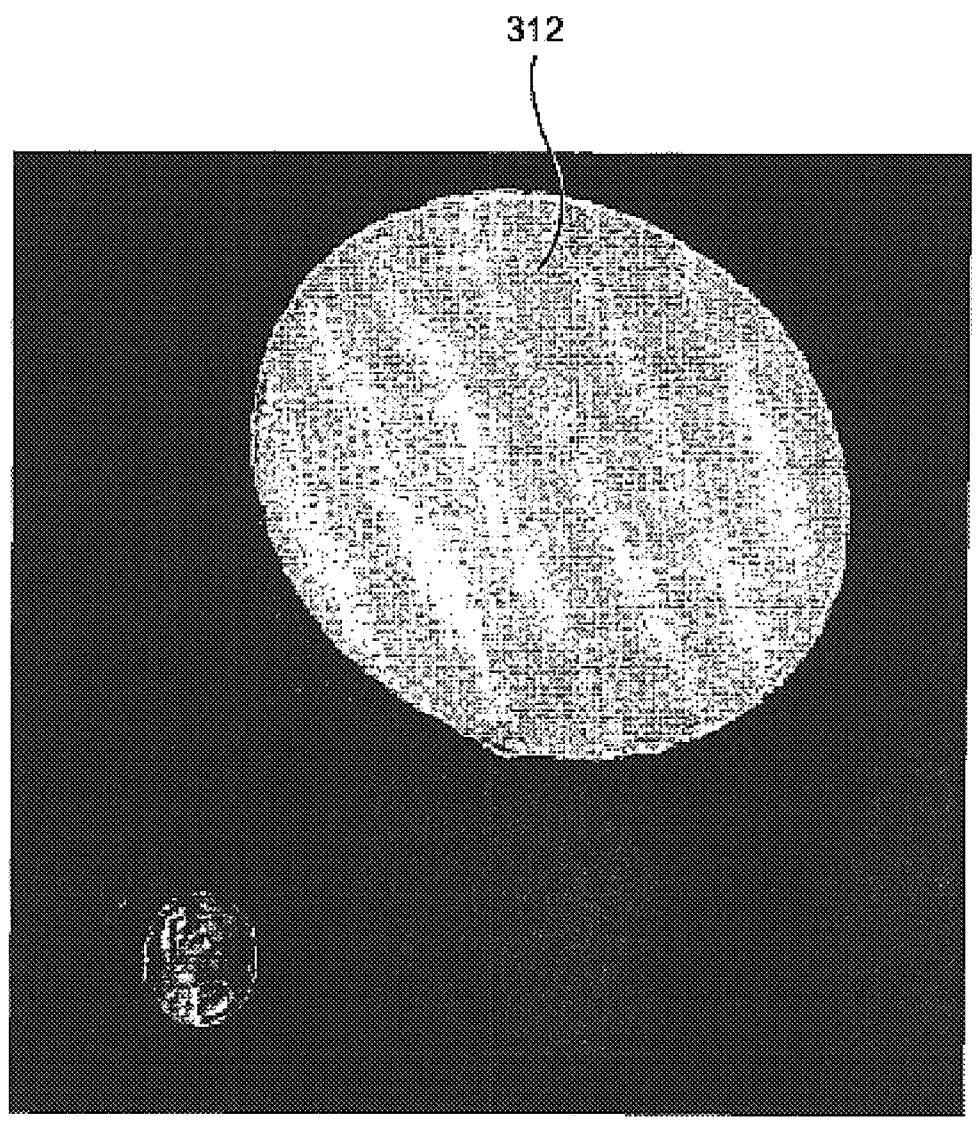
FIG. 3B shows a porous pre-form fabricated using the apparatus depicted in FIG. 3A.

As embodied herein and depicted in FIG. 3A, a perspective view of apparatus 300 for pressure casting a porous pre-form in accordance with one embodiment of the present invention is disclosed. Apparatus 300 includes mold 302 coupled to container 304 by way of vacuum hose 306. Container 304 is coupled to vacuum source 310 by way of vacuum hose 308. In practice, the slurry is poured into mold 302. Vacuum source 310 applies a vacuum to mold 302 and container 304. As a result, water is drawn from the slurry into container 304 thru a glass grit base. The vacuum is applied until the cast pre-form freely releases from mold 302. Subsequently, the cast pre-form is allowed to dry slowly in ambient conditions. FIG. 3B is a photograph of a porous pre-form 312 fabricated using the above described method and apparatus.

Figure 4:
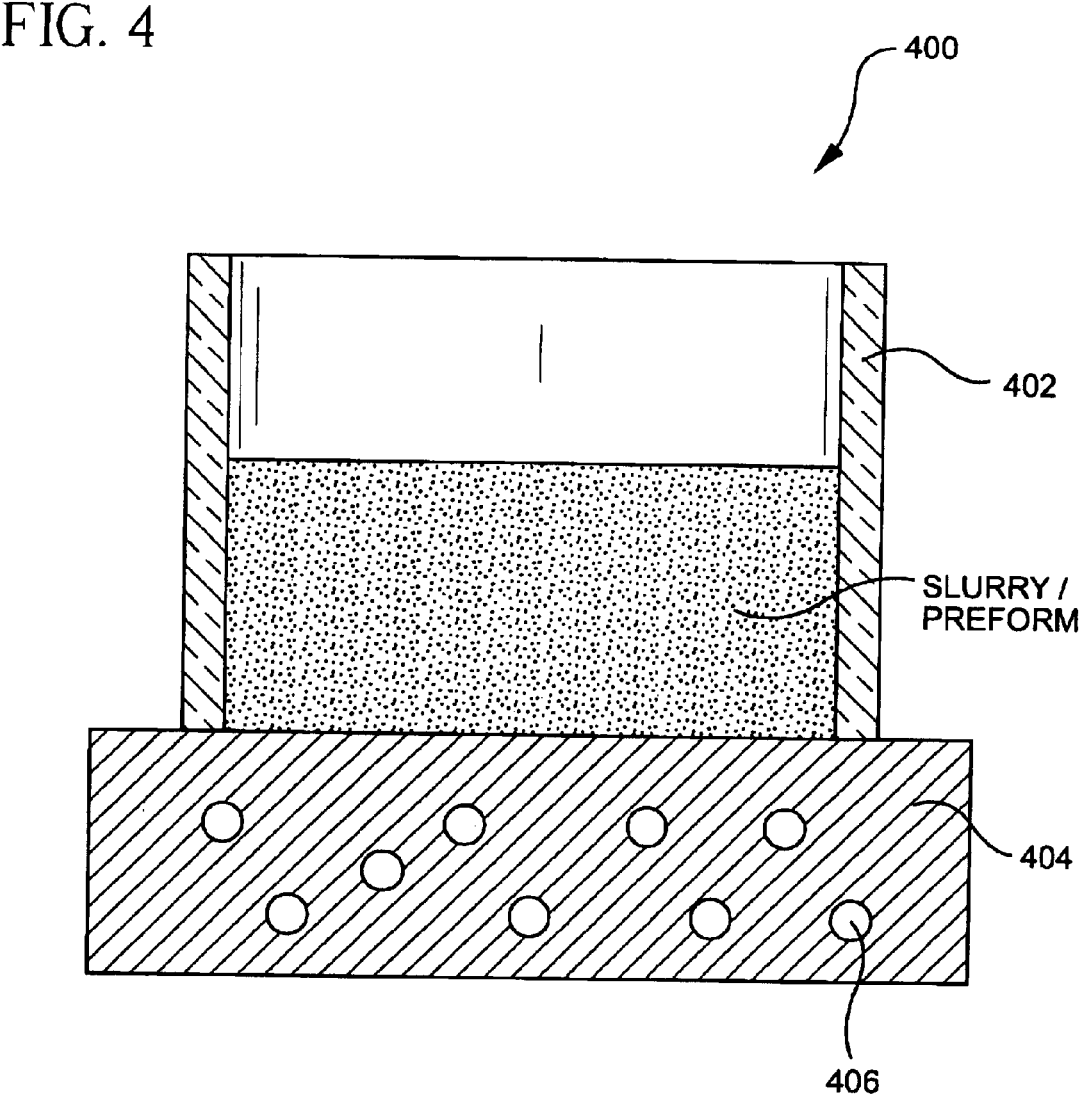
FIG. 4 is a detail view of a mold used in an apparatus for pressure casting a porous pre-form in accordance with another embodiment of the present invention.

As embodied herein and depicted in FIG. 4, a detail view of casting mold 400 in an apparatus for pressure casting a porous pre-form in accordance with another embodiment of the present invention is disclosed. Mold 400 includes wall portion 402 disposed on porous glass substrate 404. Wall portion 402 is fabricated using a Teflon or plastic material to prevent drying from the side walls. In one embodiment, glass substrate 404 is of the exact composition as the glass body being formed. This is advantageous because it substantially eliminates contaminants. Glass substrate 404 includes a plurality of capillaries and pores 406 disposed throughout. The porous nature of substrate 404 is advantageous because faster casting rates can be achieved by virtue of the capillary action. Substrate 404 is also made using the flame hydrolysis process described above. Referring back to FIG. 2, system 10 is modified by disposing a cup or container directly beneath burners 36. After the vapor stream combusts and is oxidized to form silica-titania particles, the particles are directed into the cup where they melt to form a green body. In order to maintain the porosity of substrate 404, the green body is only partially sintered. The temperature is high enough to pyrolyze the water and organic material out of the mold and lightly sinter the glass aggregate together, but the temperature is not high enough to close the pores.

Referring back to FIG. 3A and FIG. 3B, after casting and drying at room temperature, porous pre-form 312 must be thoroughly dried to eliminate any residual moisture. The remaining adsorbed water is removed by heating porous pre-form 312 to approximately 1000° C. One possible furnace schedule used for drying pre-forms 312 involves heating at a rate of 1° C./min until the temperature reaches approximately 100° C., followed by heating at a rate of 2° C./min until the temperature reaches approximately 1000° C. Subsequently, the furnace is cooled to room temperature. This schedule accomplishes the tasks of drying, organic impurity burnout, and pre-sintering.

If porous pre-form 312 is produced using high purity soot (see FIG. 2), no chlorine treatment is necessary. If the bag house soot, formed as a by-product of the flame hydrolysis process, is used to make the ultra-low expansion (ULE) glass and High Purity Fused Silica (HPFS) glass manufactured by Corning Incorporated, then it must be cleaned because it may contain impurities and/or other foreign materials. Inorganic material, as well as organic material are commonly found in the bag house soot. Most of the organic impurities are burned out during presintering, but inorganic impurities remain throughout the process of making the glass.

High temperature chlorine gas treatment is a technique used to remove impurities such as alkalis, iron, and water from porous bodies. To be effective, the chlorine gas must diffuse through the porosity of the part and reach the surface of the soot particles. At high temperatures, chlorine gas reacts with the impurities to form compounds which are vaporized and carried out of the substrate with flowing chlorine and a carrier gas such as helium or oxygen. The chlorine treatment reduces contamination from both the soot forming and the porous pre-form forming processes.

Table I provides an example of a schedule used for chlorine treatment of ULE green bodies. During each chlorine cycle a mixture of 20% helium and 80% chlorine gas flows within the furnace for one hour. The furnace reaches a maximum pressure of about 500 torr. After one hour the chlorine flow is arrested and the furnace is evacuated to about 5 torr with continued helium. The vacuum is maintained for thirty minutes after which another cycle begins. Those of ordinary skill in the art will recognize that modifications can be made to the schedule provided in Table 1. For example, in segment 1, the set point can be higher and nitrogen or oxygen can be used instead of helium.

TABLE I

| Segment | Set Point (° C.) | Heating Rate (° C./min) | Conditions |
|---|---|---|---|
| 1 | 825 | 2 | Vacuum w/ minimum He flow |
| 2 | 825 | - - - | Up to 6 chlorine cycles |
| 3 | Room Temp. | Furnace Cool | Vacuum w/ minimum He flow |

After chlorine treatment the porous pre-form is consolidated into a glass body by applying heat. In one embodiment the pre-form is heated to approximately 1650° C. for about ten minutes. The porous pre-form can also be consolidated by sintering using a high temperature electrically heated furnace. The sintering of glass particles is achieved via viscous flow, and is therefore time and temperature dependent. The sintering temperature is preferably above 1000° C., 1400° C. or 15000° C. or more preferably between 1000° C. and 1600° C. One example of a sintering schedule includes heating at a rate of 5° C./min until the temperature reaches between 1400–1450° C. followed by a more rapid cooling rate of 20° C./min to the annealing temperature.

EXAMPLES

The invention will be further clarified by the following examples which are intended to be exemplary of the invention.

Example 1

Initially, 267 ml of NH4OH was added to de-ionized water to create a 2 liter stock solution. About 700 g of aggregate was mixed with the solution to form a slurry. The slurry was pressure cast using the apparatus described above. A vacuum with desiccant was used to remove the water to slowly build up the cast pre-form. After about 24 hours the remaining slurry was poured into a waste container. The pre-form was allowed to remain in the mold with the vacuum applied for a few more hours until the cast pre-form freely released from the mold. The mold includes a substrate consisting of glass having the same composition as the aggregate. After removal, the pre-form was allowed to dry slowly at room temperature for another 24 hours to remove most of the remaining water. Subsequently, the pre-form was heated to approximately 1000° C. to remove any remaining adsorbed water.

The pre-form was chlorine treated by being heated to 1000° C. under flowing nitrogen. Chlorine gas was introduced and three cycles of vacuum were applied. A definition of a chlorine treatment cycle is provided in the description above. The pre-form was removed from the furnace and cooled. Subsequently, the chlorine treated pre-form was heated to 1650° C. for approximately ten minutes and consolidated into a striae free glass body.

Example 2

A stock solution was prepared by mixing water with 0.1 wt % ammonia. A slurry was prepared by mixing 70 wt % soot powder with 30 wt % stock solution. The soot used in the aggregate included 7 wt % titania. The slurry was further mixed with ULE glass cutlet that was crushed to around a 10 to 14 mesh size at a ratio of about 1:1 by weight. The mixture then poured into a porous mold in such a way as to prevent gas entrapment. The mixture was allowed to dry over a two day period. Subsequently, the pre-form was heated to approximately 1000° C. to remove any remaining adsorbed water.

The pre-form was chlorine treated by being heated to 1000° C. under flowing nitrogen. Chlorine gas was introduced and three cycles of vacuum were applied. A definition of a chlorine treatment cycle is provided in the description above. The pre-form was removed from the furnace and cooled. Subsequently, the chlorine treated pre-form was heated to 1650° C. for approximately ten minutes and consolidated into a striae free glass body.

Example 3

This example is virtually identical to Example 2, with the exception of the composition of the aggregate. In this example ULE glass beads were used instead of ULE cullet. The beads were formed using fine glass powder(0.1:m typical size). The powder was agglomerated by such spray drying or forming droplets of a slurry on filter paper. The resulting material was consolidated into beads by heating in a clean atmosphere to a temperatures of around 1400° C.

It will be apparent to those skilled in the art that various modifications and variations can be made to the present invention without departing from the spirit and scope of the invention. For example, the present invention may be used with other casting techniques as are well known in the art, such as, for example, slip casting, vacuum casting and gel casting. Thus, it is intended that the present invention cover the modifications and variations of this invention provided they came within the scope of the appended claims and their equivalents.

What is claimed is:

1. A method for forming a glass body, the method comprising:
   providing a glass aggregate;
   mixing the glass aggregate with a liquid to form a slurry;
   casting the slurry in a mold to form a porous pre-form, the mold including a porous glass substrate; and
   consolidating the porous pre-form into the glass body.

2. The method of claim 1, wherein the step of providing the glass aggregate includes forming soot particles as a by-product of a flame hydrolysis process.

3. The method of claim 1, wherein the step of providing glass aggregate further comprises:
   forming soot particles as a by-product of a flame hydrolysis process;
   providing a coarse glass powder having the same composition as the soot particles, the coarse glass powder including glass particles that are, on average, larger than the soot particles; and
   mixing the soot particles and the coarse glass powder.

4. The method of claim 1, further comprising the step of cleaning the porous pre-form to remove impurities.

5. The method of claim 4, wherein the porous pre-form is cleaned by applying a liquid or a gas while the pre-form is in the mold.

6. The method of claim 4, wherein the step of cleaning further comprises:
   disposing the porous pre-form in a high temperature chlorine gas atmosphere, the high temperature being lower than a sintering temperature of the porous pre-form; and
   treating the porous pre-form by allowing the chlorine gas to react with impurities in the porous pre-form for a pre-determined time.

7. The method of claim 6, wherein the high temperature is between 825° C. to 1000° C.

8. The method of claim 1, wherein the liquid includes ammonia hydroxide.

9. The method of claim 1, further comprising the step of heating the porous pre-form to approximately 1000° C.

10. The method of claim 1, wherein the step of casting includes pressure casting the slurry.

11. The method of claim 10, wherein the step of pressure casting the slurry further comprises:
   disposing the slurry in a mold apparatus, the mold apparatus including a mold and a water collection chamber;
   adding a desiccant to the slurry; and
   applying a vacuum to the slurry, the vacuum and desiccant acting in concert to transfer water from the mold to the water collection chamber.

12. The method of claim 1, wherein the step of consolidating includes heating the porous pre-form to a temperature of 1600° C.

13. The method of claim 12, wherein the step of consolidating includes heating the porous pre-form to a temperature of 1600° C. for approximately ten minutes.

14. The method of claim 9, wherein the step of heating includes sintering the porous pre-form.

15. The method of claim 14, wherein the step of sintering the porous pre-form is performed at a temperature above 1000° C.

16. The method of claim 14, wherein the porous pre-form is sintered at a temperature of approximately 1400° C.

17. The method of claim 14, wherein the porous pre-form is sistered at a temperature of approximately 1500° C.

18. The method of claim 14, wherein the porous pre-form is sistered at a temperature of approximately 1650° C.

19. The method of claim 14, wherein the step of sintering further comprises:
   disposing the porous pre-form in a high temperature chlorine gas atmosphere, the high temperature being lower than a sintering temperature of the porous pre-form; and
   treating the porous pine-form by allowing the chlorine gas to react with impurities in the porous pre-form for a pre-determining time.

20. The method of claim 14, wherein the step of sintering is performed in a substantial vacuum.

21. The method of claim 14, wherein the step of sintering is performed in a helium atmosphere.

22. The method of claim 1, wherein the glass substrate is of the same composition as the glass aggregate.

23. The method of claim 1, wherein the glass aggregate includes glass soot, glass cullet, and glass pieces larger than the glass cullet.

24. The method of claim 1, wherein the step of casting is performed using a slip casting technique.

25. The method of claim 1, wherein the step of casting is performed using a vacuum casting technique.

26. The method of claim 1, wherein the step of casting is performed using a gel casting technique.

27. A method for forming a glass body, the method comprising
   providing glass particles, the particles including relatively fine glass soot particles mixed with relatively coarse glass particles;
   mixing the glass particles with a liquid to form a slurry;
   providing a mold having a porous glass substrate;
   pressure casting the slurry in the mold to form a porous pre-form; and
   consolidating the porous pre-form to form a glass object.

28. The method of claim 27, wherein the mold is formed from glass soot particles as a by-product of a flame hydrolysis process, the glass soot particles being collected in a containment vessel to form a body, the body being partially sintered to form at least a portion of the mold.

29. A method for forming a glass body, the method comprising:
   providing a glass aggregate;
   mixing the glass aggregate with a liquid to form a slurry;
   pressure costing the slurry in a mold to form a porous pre-form;
   disposing the porous pre-form in a chlorine gas atmosphere heated to a predetermined temperature, the chlorine gas reacting with impurities in the porous preform for a pre-determined time, whereby the impurities are vaporized and carried out of the porous pre-form; and
   consolidating the porous pre-form to form a glass object.

30. The method of claim 29, wherein the step of consolidating includes heating the porous pre-form.

31. The method of claim 30, wherein heating the porous pre-form includes sintering the porous pre-form.

32. The method of claim 29, wherein the predetermined temperature is lower than a sintering temperature of the porous pre-form.

33. A method for forming a glass body, the method comprising:
   providing a glass particles, the particles including relatively fine glass soot particles mixed with relatively coarse glass particles;
   mixing the glass particles with a liquid to form a slurry;
   pressure casting the slurry in a mold to form a porous pre-form;
   disposing the porous pre-form in a chlorine gas manosphere heated to a predetermined temperature, the chlorine gas reacting with the impurities in the porous pre-form for a pre-determined time, whereby the impurities are vaporized and carried out of the porous pre-form; and
   consolidating the porous pre-form to form a glass object.

34. The method of claim 33, wherein the step of consolidating includes heating the porous pre-form.

35. The method of claim 34, wherein heating the porous pre-form includes sintering the porous pre-form.

36. The method of claim 33, wherein the predetermined temperature is lower than a sintering temperature of the porous pre-form.

37. A method for forming a glass body, the method comprising:
   providing a glass aggregate;
   mixing the glass aggregate with a liquid to form a slurry;
   casting die slurry in a mold to form a porous pre-form, the mold including a porous glass substrate baying the same composition as the glass aggregate; and
   consolidating the porous pre-form into the glass body.

38. A method for forming a glass body, the method comprising:
   forming soot particles as a by-product of a flame hydrolysis process;
   mixing the soot particles with a coarse glass cullet to form an aggregate;
   mixing the aggregate with a liquid to form a slurry;
   vacuum casting the slurry in a mold to form a porous pre-form, the mold including a porous glass substrate; and
   consolidating the porous pre-form into the glass body.

* * * * *

UNITED STATES PATENT AND TRADEMARK OFFICE
CERTIFICATE OF CORRECTION

PATENT NO. : 6,832,493 B2
DATED : December 21, 2004
INVENTOR(S) : Bowden et al.

It is certified that error appears in the above-identified patent and that said Letters Patent is hereby corrected as shown below:

Column 9,
Line 36, "treating the porous pine-form" should be -- treating the porous pre-form --

Coumn 10,
Lines 30-31, "disposing the porous pre-form in a chlorine gas manosphere" should be -- disposing the porous pre-form in a chlorine gas atmosphere --
Line 48, "casting die slurry" should be -- casting the slurry --
Line 49, "the mold including a porous glass substrate baying" should be -- the mold including a porous glass substrate having --

Signed and Sealed this

Third Day of May, 2005

JON W. DUDAS
*Director of the United States Patent and Trademark Office*